US007822886B1

(12) United States Patent
Miller et al.

(10) Patent No.: US 7,822,886 B1
(45) Date of Patent: Oct. 26, 2010

(54) DATAFLOW CONTROL FOR APPLICATION WITH TIMING PARAMETERS

(75) Inventors: Ian D. Miller, Charlotte, NC (US); Jorn W. Janneck, San Jose, CA (US); David B. Parlour, Fox Chapel, PA (US)

(73) Assignee: Xilinx, Inc., San Jose, CA (US)

( * ) Notice: Subject to any disclaimer, the term of this patent is extended or adjusted under 35 U.S.C. 154(b) by 352 days.

(21) Appl. No.: 12/103,995

(22) Filed: Apr. 16, 2008

(51) Int. Cl.
*G06F 3/00* (2006.01)

(52) U.S. Cl. ............................ 710/29; 345/99; 345/204

(58) Field of Classification Search .................... 710/29
See application file for complete search history.

(56) References Cited

U.S. PATENT DOCUMENTS

| | | | | | |
|---|---|---|---|---|---|
| 4,497,023 | A * | 1/1985 | Moorer | 712/205 |
| 5,274,833 | A * | 12/1993 | Shima et al. | 712/25 |
| 5,577,203 | A * | 11/1996 | Reinert et al. | 345/558 |
| 6,047,335 | A * | 4/2000 | Takizawa | 710/22 |
| 6,247,058 | B1 * | 6/2001 | Miller et al. | 709/234 |
| 6,754,192 | B2 * | 6/2004 | Kennedy | 370/331 |
| 6,954,843 | B2 * | 10/2005 | Matsuura et al. | 712/25 |
| 2004/0268224 | A1 * | 12/2004 | Balkus et al. | 715/500.1 |

OTHER PUBLICATIONS

Xilinx, Inc., "Video Input/Output Daughter Card," User Guide, Oct. 31, 2007, pp. 1-68, available from Xilinx, Inc., 2100 Logic Drive, San Jose, CA 95124.

* cited by examiner

*Primary Examiner*—Henry W Tsai
*Assistant Examiner*—Elias Mamo
(74) *Attorney, Agent, or Firm*—W. Eric Webostad; Thomas George

(57) ABSTRACT

Dataflow control for an application with timing parameters, including interfacing temporal and non-temporal domains, is described. The domains receive input data to a first dataflow network block, which is processed for untimed output of first tokens. The first tokens are obtained by a memory interface for timed writing of data portions of the first tokens to data storage and for timed reading of the data portions therefrom. Sending of the data portions read to a first queue of a first controller block is untimed, and the data portions are output by the first controller block with physical timing parameters. Second tokens are generated by the first controller block responsive to the physical timing parameters. The second tokens are fed back to a second queue of the first dataflow network block to control rate of generation of the first tokens by the first dataflow network block.

20 Claims, 3 Drawing Sheets

DATAFLOW CONTROL FOR APPLICATION WITH TIMING PARAMETERS

FIELD OF THE INVENTION

The invention relates to integrated circuit devices ("ICs"). More particularly, the invention relates to dataflow control for an application with timing parameters for an IC.

BACKGROUND OF THE INVENTION

Programmable logic devices ("PLDs") are a well-known type of integrated circuit that can be programmed to perform specified logic functions. One type of PLD, the field programmable gate array ("FPGA"), conventionally includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile conventionally includes both programmable interconnect and programmable logic. The programmable interconnect conventionally includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic conventionally may be programmed by loading a stream of configuration data into internal configuration memory cells that define how the programmable elements are configured. The configuration data can be read from memory (e.g., from an external non-volatile memory, such as flash memory or read-only memory) or written into the FPGA by an external device. The collective states of the individual memory cells then determine the function of the FPGA.

Another type of PLD is the Complex Programmable Logic Device, or CPLD. A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is conventionally stored on-chip in non-volatile memory. In some CPLDs, configuration data is stored on-chip in non-volatile memory, then downloaded to volatile memory as part of an initial configuration ("programming") sequence.

For all of these programmable logic devices ("PLDs"), the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

PLDs may include an embedded processor. Even though the example of an FPGA is used, it should be appreciated that other integrated circuits with programmable logic may be used.

Conventionally, embedded processors are designed apart from the FPGAs. Such embedded processors are thus generally not specifically designed for implementation in FPGAs, and thus such embedded processors may have operating frequencies that significantly exceed a maximum operating frequency of programmable logic. Moreover, parameters such as latency, transistor gate delay, data throughput, and the like designed into the embedded processors may be assumed to be present in the environment to which the embedded processor is coupled.

Performance of a design instantiated in programmable logic of an FPGA ("FPGA fabric") coupled to an embedded processor may be significantly limited by disparities between the operating parameters of the FPGA fabric and those of the embedded processor. Thus, if, as before, embedded processor interfaces, such as processor local bus ("PLB") interfaces, are brought directly out to FPGA fabric, disparities in operating parameters between the embedded processor and the FPGA fabric constitute a significant limitation with respect to overall performance. So, an embedded processor coupled to a design instantiated in FPGA fabric may have to wait on such design instantiated in FPGA fabric, meaning the limiting factor with respect to performance was substantially due to the design instantiated in FPGA fabric. For example, accessing a memory controller instantiated in FPGA fabric coupled to the embedded processor led to a significant bottleneck with respect to performance.

Alternatively, a memory controller, previously instantiated in FPGA fabric, may be hardened or provided as an ASIC core coupled to the embedded processor. By hardening a circuit previously instantiated in FPGA fabric, it is generally meant replacing or bypassing configuration memory cells with hard-wired or dedicated connections. Additionally, peripherals coupled to the embedded processor may be hardened or provided as ASIC cores.

However, ASIC cores, and more generally ASICs, are manufactured for high performance. More particularly, semiconductor processes and semiconductor process integration rules ("semiconductor process design rules") associated with ASICs, including ASIC cores, are generally more challenging, and thus yield for such ASIC cores may be relatively low as compared to yield of FPGAs. FPGAs, which may have a larger and longer run rate than ASICs and which may not be as performance driven, may employ semiconductor processing design rules that are more conducive to higher die per wafer yield than ASICs.

It should be appreciated that an FPGA manufactured with an ASIC core uses FPGA semiconductor process design rules. Thus, ASIC cores manufactured in FPGAs perform worse than such ASIC cores manufactured as part of ASICs or as standalone ASICs. Thus, manufacturing FPGAs with hard-wired ASIC cores would not achieve competitive performance with standalone ASICs.

Moreover, manufacturing FPGAs with hardened or ASIC core memory controllers or peripherals, or a combination thereof, would reduce flexibility of design of such FPGAs. One significant reason that users purchase FPGAs is the blank slate offered by FPGA fabric for implementing a user-created circuit design. If FPGAs come with ASIC cores that take the place of some FPGA fabric resources, users may be both locked into the particular offering of hardened or ASIC core memory controllers or peripherals, and have even less flexibility of design due to fewer FPGA fabric resources for implementing their circuit design. This loss of flexibility, combined with the fact that such hardened or ASIC core memory controllers or peripherals implemented in FPGA fabric may be significantly slower than their standalone ASIC counterparts, would make FPGAs less attractive to users.

Accordingly, it would be desirable and useful to provide enhance performance of FPGAs without a significant loss of design flexibility.

SUMMARY OF THE INVENTION

One or more aspects of the invention generally relate to dataflow control for an application with timing parameters for an IC.

An aspect of the invention relates generally to a method for interfacing temporal and non-temporal domains. The domains receive input data to a first dataflow network block. The input data is processed by the first dataflow network block to output first tokens. Output of the first tokens from the first dataflow network block is untimed. The first tokens are obtained by a memory interface for writing data portions of the first tokens to data storage. Writing of the data portion of the first tokens to the data storage is timed. Reading of the data portions from the data storage is timed. Sending of the data portions read to a first queue of a first controller block is untimed. The data portions obtained from the first queue by the first controller block are output. The data portions are output by the first controller block with physical timing parameters. Second tokens are generated by the first controller block responsive to the physical timing parameters. The second tokens are fed back to a second queue of the first dataflow network block to control rate of generation of the first tokens by the first dataflow network block.

Another aspect of the invention relates generally to a hybrid dataflow timed domain system. The system has a first dataflow network block coupled to receive input data. The first dataflow network block is configured to process the input data to output first tokens. The first tokens output from the first dataflow network block are untimed. A memory interface is coupled to receive the first tokens output from the first dataflow network block and configured to write data portions of the first tokens to data storage. The data storage is coupled to the memory interface for timed writing of the data portions of the first tokens to the data storage and for timed reading of the data portions from the data storage. A first queue of a first controller block is coupled for untimed receipt of the data portions read from the data storage. The first controller is configured to obtain the data portions from the first queue for output with physical timing parameters by the first controller block. The first controller is configured to generate second tokens responsive to the physical timing parameters. The first controller is coupled to feed back the second tokens to a second queue of the first dataflow network block. The first dataflow network block is configured to control rate of generation of the first output tokens responsive to the second tokens fed back.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
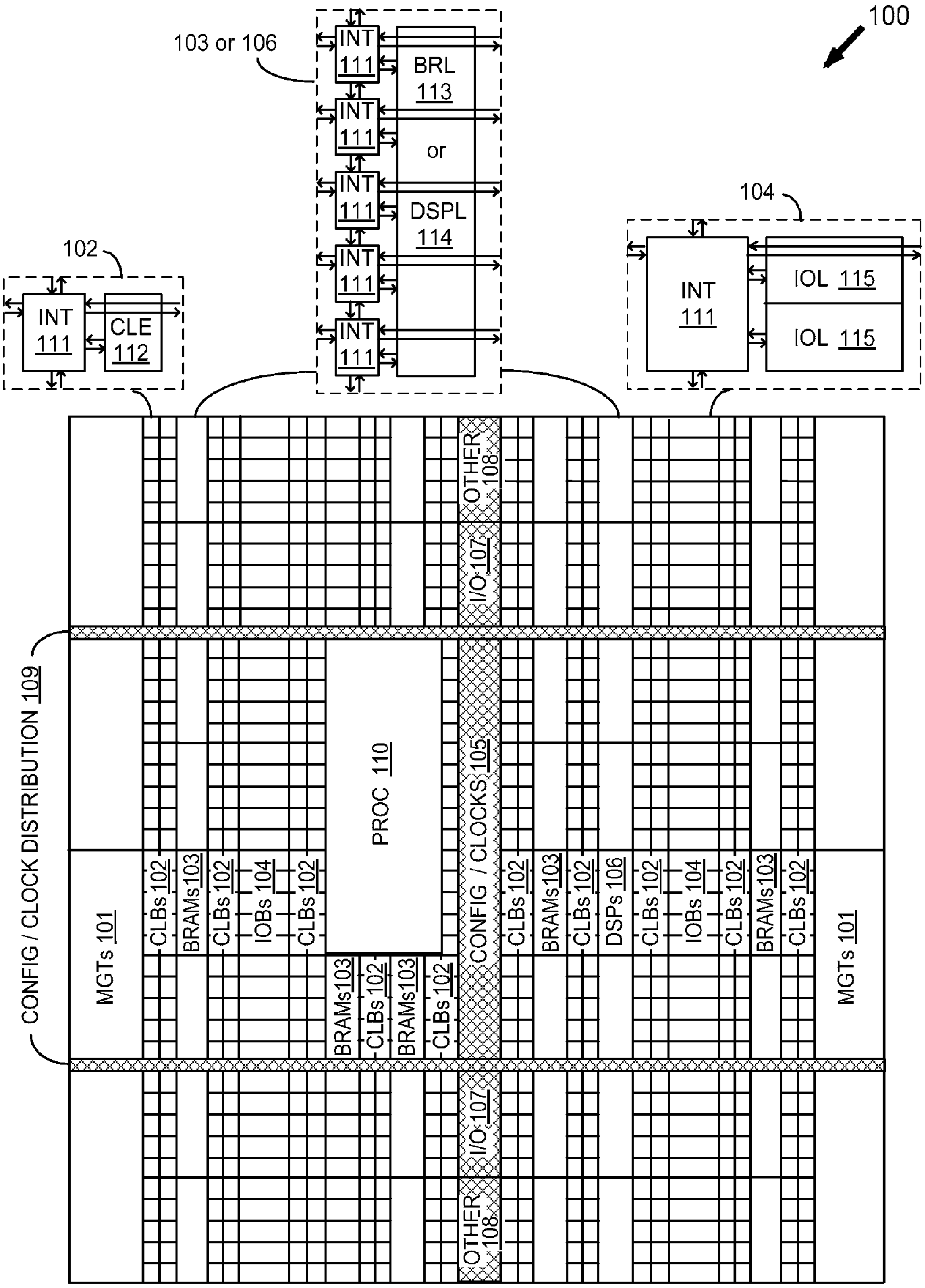
FIG. 1 is a simplified block diagram depicting an exemplary embodiment of a columnar Field Programmable Gate Array ("FPGA") architecture in which one or more aspects of the invention may be implemented.

As noted above, advanced FPGAs can include several different types of programmable logic blocks in the array. For example, FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element in each adjacent tile. Therefore, the programmable interconnect elements taken together implement the programmable interconnect structure for the illustrated FPGA. The programmable interconnect element 111 also includes the connections to and from the programmable logic element within the same tile, as shown by the examples included at the top of FIG. 1.

For example, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element ("DSPL") 114 in addition to an appropriate number of programmable interconnect elements. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the pictured embodiment, a columnar area near the center of the die (shown crosshatched in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, processor block 110 spans several columns of CLBs and BRAMs.

Note that FIG. 1 is intended to illustrate only an exemplary FPGA architecture. For example, the numbers of logic blocks in a column, the relative width of the columns, the number and order of columns, the types of logic blocks included in the columns, the relative sizes of the logic blocks, and the interconnect/logic implementations included at the top of FIG. 1 are purely exemplary. For example, in an actual FPGA more than one adjacent column of CLBs is typically included wherever the CLBs appear, to facilitate the efficient implementation of user logic, but the number of adjacent CLB columns varies with the overall size of the FPGA.

Figure 2:
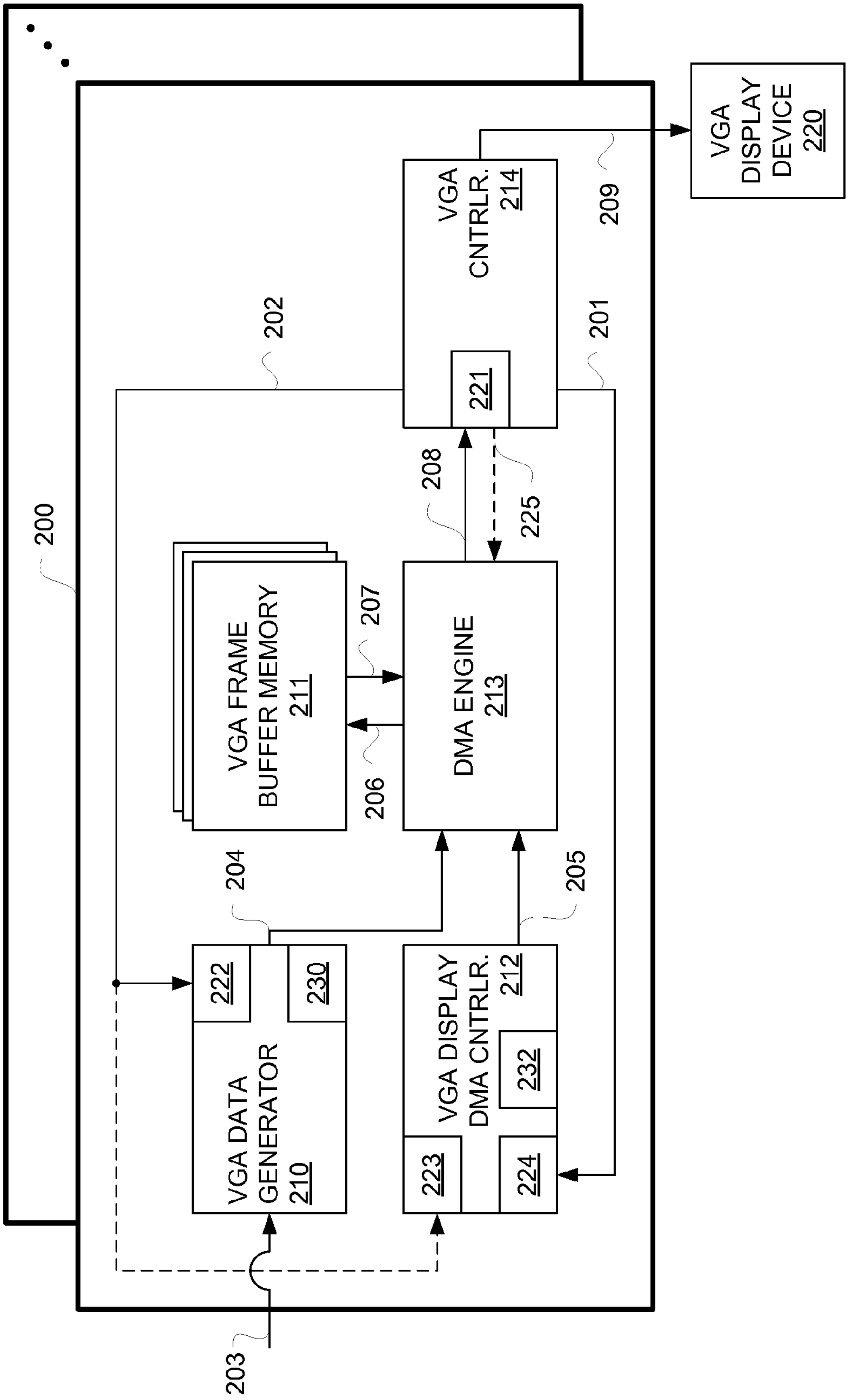
FIG. 2 is a block diagram depicting a hybrid dataflow timed domain system ("hybrid system"), in accordance with an embodiment of the present invention.

FIG. 2 is a block diagram depicting an exemplary embodiment of a hybrid dataflow timed domain system ("hybrid system") 200. Although the example of a Video Graphics Array ("VGA") system is described, it should be appreciated that other systems having specific timing parameters associated with physical properties may be used as combined with a dataflow network.

Hybrid system 200 includes VGA data generator 210, VGA display direct memory access ("DMA") controller 212, VGA frame buffer memory 211, DMA engine 213, and VGA controller 214. Input data 203, which may be in an MPEG format, is provided to VGA data generator 210. Display output 209 of VGA controller 214 includes RGB data, horizontal/vertical sync signals, interval blanking signals, and a pixel clock signal, among other signals. It should be appreciated that output 209 is in a timed domain, and input data 203 is in an untimed domain. The following description is for interfacing the untimed domain to the timed domain, or more particularly for interfacing a hardware subsystem designed and implemented as a dataflow network to an access/control subsystem having specific timing parameters.

VGA data generator 210 and VGA display DMA controller 212 are respective dataflow processing blocks, which may be considered dataflow networks or dataflow subnetworks. VGA data generator 210 and VGA display DMA controller 212 are in an untimed domain which is dependent upon the flow of data. In contrast, VGA frame buffer memory 211 is in a timed domain. Timed domain blocks, such as VGA frame buffer memory 211, generally have interfaces with specified timing parameters, such as number of clock cycles to read and write data. For example, VGA frame buffer memory 211 may have associated therewith clock cycle latencies for read and write operations. In contrast, VGA data generator 210 and VGA display DMA controller 212, which are dataflow blocks, interact based on messages or tokens (hereafter tokens) which are communicated via queues. Tokens stored in a queue are ordered and leave such queue when ready to be consumed by an actor, namely a processing element of a dataflow block. Accordingly, there is no specific timing guarantee with respect to the relationship of tokens across various queues with respect to their consumption.

DMA engine 213 and VGA controller 214 are hybrid blocks having both dataflow functionality and timed behavior on separate interfaces. For example, DMA engine 213 has dataflow functionality for interfacing with VGA data generator 210 and VGA display DMA controller 212, and has a timed behavior interface for interfacing with VGA frame buffer memory 211. Similarly, VGA controller 214 interfaces to the untimed domain of VGA data generator 210 and VGA display DMA controller 212 dataflow blocks, as well as interfaces to timed behavior for receiving pixel data 208 from DMA engine 213 and for providing display output 209 to VGA display device 220.

Although the example of video data, such as MPEG-encoded video data, is described, it should be appreciated that other types of data which have specific parameters associated with timed output, such as audio data for example, may be processed in a system or subsystem having both untimed dataflow components and a time behavior interfaces in accordance with providing feedback tokens as described herein. Along those lines, it should be appreciated that processing of input data 203 is generally much faster than the display rate of display output 209.

VGA data generator 210 provides address information and data 204 to DMA engine 213. VGA display DMA controller 212 provides address and length information 205 to DMA engine 213. Both of outputs 204 and 205 may be provided at rates that are faster than the rate at which data is read from VGA frame buffer memory 211. To facilitate independence of write and read rates, VGA frame buffer 211 and DMA engine 213 may each have separate read and write ports, namely each may be multiported. DMA engine 213 may write data at associated addresses, both of which are obtained from output 204 to VGA frame buffer memory 211 as generally indicated by arrow 206. Using address and length from output 205, DMA engine 213 may read out data written to VGA frame buffer memory 211, as generally indicated by arrow 207.

More particularly, data provided from VGA data generator 210 is provided to addresses in VGA frame buffer memory 211 via DMA engine 213. This may be thought of as a first data stream 206 which is operated generally asynchronously with respect to a second data stream 207. VGA frame buffer memory 211 reads out data via second data stream 207 to provide to VGA controller 214 via DMA engine 213. The data read out and passed via DMA engine 213 is provided as pixel data 208. Pixel data 208 is stored in a pixel data queue 221 of VGA controller 214. This flow of data from VGA frame buffer memory 211 to VGA controller 214 may be thought of as the second data stream, and this second data stream is synchronized for providing display output 209.

It should be appreciated that address information and data 204 output from VGA data generator 210 is a separate stream from address and length information 205 provided from VGA display DMA controller 212. In other words, prior to being provided to DMA engine 213, these two streams are unsynchronized with respect to one another. However, these two unsynchronized streams are synchronized via DMA engine 213, namely for synching address and data. In other words, two free running dataflow processes respectively associated with VGA data generator 210 and VGA display DMA controller 212 are synchronized to provide output data 209. This synchronization is described below in further detail with reference to start of line signal 201 and end of frame signal 202, both of which are provided from VGA controller 214.

VGA data generator 210 is a dataflow block which is used to populate a complete image in VGA frame buffer memory 211. Double buffering may be used to buffer more than one image or multiple instances of hybrid system 200 may be used for interleaved output of images. However, for purposes of clarity by way of example and not limitation, it shall be assumed that a single instance of hybrid system 200 is used with single buffering.

VGA data generator 210 communicates address information and data 204 as tokens ("address and data tokens 204") to DMA engine 213 for storing pixel data in VGA frame buffer memory 211. DMA engine 213 stores specified data at a linked address within VGA frame buffer memory 211 for assembling a complete frame of image data for display on VGA display device 220. There may be any number of variations regarding the specific details for implementation of VGA frame buffer memory 211 and DMA engine 213.

VGA display DMA controller 212 is a dataflow block configured to generate address and length information 205 as tokens ("address and length tokens 205"). Address and length tokens 205 are sent to DMA engine 213. Multiples (e.g., "tuples") of address and length tokens 205 may constitute a message to cause DMA engine 213 to retrieve a number of pixels from an image frame populated by VGA data generator 210 and stored in VGA frame buffer memory 211. The number of pixels retrieved from VGA frame buffer memory 211 by DMA engine 213 may be defined by the length or lengths indicated in the message and the location within the image frame to retrieve pixel data may be determined from the address or addresses indicated in the message.

Pixel values retrieved from VGA frame buffer memory 211 by DMA engine 213 are sent to VGA controller 214 via a dataflow interface, indicated as pixel data 208, which is input to pixel data queue 221 of VGA controller 214. Queue 221 may be implemented as a FIFO. Pixel data stored in pixel data queue 221 is used to generate corresponding VGA display data and control signals to provide display output 209 with specified timing for VGA display device 220.

In this example, depth of pixel data queue 221 is one horizontal line of an image displayed on VGA display device 220. Alternatively, depth of pixel data queue 221 may be sufficient for storing an entire frame of an image; however this would involve more storage resources. Consequently, in order to conserve storage resources, pixel data queue 221 may be limited to one or more lines of an image where the total number of such lines of pixel data stored is less than a complete image. Start of line signal 201 may be provided as tokens ("start of line tokens 201") from VGA controller 214 to VGA display DMA controller 212 and more particularly to dataflow queue 224, which may be implemented as a FIFO, of VGA display DMA controller 212. Start of line tokens 201 may correspond to a horizontal sync for one line of pixel data queuing embodiment.

VGA controller 214 spans untimed dataflow and timed display domains for taking image data from a dataflow domain and generating data and control signals within a timed display domain in order to drive display output 209 from VGA display device 220. Conventionally, VGA displays are structured as a sequence of display lines, with each horizontal display line being one pixel in height by the width of the display in pixels with consecutive rows of lines displayed to make up the full height of a displayed image. The rate at which the displayed image is completely updated is known as the refresh rate. For example, an image frame may be displayed once per refresh cycle.

In addition to the timed output signals associated with display output 209, VGA controller 214 issues tokens for start of line signal 201 ("tokens 201") and for end of frame signal 202 ("tokens 202"). Because VGA controller 214 operates in both the timed display and untimed dataflow domains, VGA controller 214 is able to generate these dataflow tokens 201 and 202 at exact timed intervals. Consequently, VGA controller 214 is capable of asserting specific timing to hybrid system 200 via tokens 201 and 202.

End of frame tokens 202 are provided from VGA controller 214 to VGA data generator 210 and VGA display DMA controller 212. Providing end of frame tokens 202 to VGA display DMA controller 212 may be optional depending on the application; more particularly, end of frame tokens 202 need not be provided to VGA display DMA controller 212 where no correlation between start of line tokens 201 and end of frame tokens 202 by VGA display DMA controller 212 need be performed. End of frame tokens 202 from VGA controller 214 may be provided to a dataflow queue 222 of VGA data generator 210 and to a dataflow queue 223 of VGA display DMA controller 212. Queues 222 and 223 may be implemented as respective FIFOs. For purposes of clarity and not limitation, it shall be assumed that end of frame tokens 202 are provided only to VGA generator 210 and VGA display DMA controller 212.

End of frame tokens 202 are issued by VGA controller 214 subsequent to completion of one display update of VGA display device 220, and this time interval ("$T_{eof}$") may be expressed as the inverse of the refresh rate of VGA display device 220 as indicated in the following Equation (1):

$$T_{eof} = \frac{1}{RefreshRate}. \tag{1}$$

Start of line tokens 201 are issued by VGA controller 214 prior to the display of a line of active video data, excluding blanking interval lines of VGA display device 220. One start of line token 201 is issued per active line of a displayed image, and another start of line token 201 is issued a period of seconds after issuance of the prior token. This time period ("$T_{sol}$") between issuing of start of line tokens 201 may be mathematically expressed as indicated in the following Equation (2):

$$T_{sol} = \frac{T_{eof}}{H}, \tag{2}$$

where H is the height in lines of the displayed image on VGA display device 220. It should be appreciated that during a video blanking interval, the start of line time period expressed in Equation (2) may be significantly longer due to the number of non-active video lines.

For purposes of clarity by way of example and not limitation, it shall be assumed that hybrid system 200 allows data to be processed as soon as it is available. In other words, it shall be assumed that VGA controller 214 and DMA engine 213 generally operate as data dependent open loops. Thus, in order for video data processed by hybrid system 200 to be displayed correctly, as may be observed by an external viewer, hybrid system 200 is configured to be responsive to the frame timed interval expressed in Equation (1). Furthermore, data storage associated with pixel data queue 221 is limited to one or more horizontal image lines, and thus to avoid an overflow condition of pixel data queue 221, supply of pixel data 208 by DMA engine 213 is throttled responsive to the start of line time interval expressed in Equation (2). Moreover, VGA display DMA controller 212 is configured to operate at a sufficient data output rate to avoid an underrun condition of pixel data queue 221, namely to operate faster than output of pixel data queue 221.

Implementation of an interface between timed VGA controller 214 and dataflow portions, namely VGA data generator 210 and VGA display DMA controller 212, of hybrid system 200 includes an ability to stall behavior of VGA data generator 210 and VGA display DMA controller 212, respectively, responsive to tokens 202 and 201 produced by VGA controller 214, as described below in additional detail. More particularly, the tokens produced by VGA controller 214 in the timed domains, namely the timed end of frame and start of line domains, while remaining sufficiently reactive to supply data in a timely fashion to avoid underrun of pixel data queue 221, may have to be stalled responsive to such tokens to avoid overrun of pixel data queue 221.

With respect to frame rate timing, the timing assertion that occurs in VGA data generator 210 has to do with the rate at which video data is produced. The rate at which video data, namely address and data tokens 204, is produced generally should not on average exceed the rate at which video frames are displayed by VGA display device 220 under control of VGA controller 214. To ensure matching frame rate between VGA controller 214 and VGA data generator 210, VGA controller 214 supplies end of frame tokens 202 to dataflow queue 222 of VGA data generator 210. As previously described, end of frame tokens 202 are produced in intervals as indicated by Equation (1).

VGA data generator 210 consumes end of frame tokens 202 as described below in additional detail. Furthermore, end of frame tokens 202 consumed by VGA data generator 210 may be used to stall production of a next frame until a next end of frame token 202 has been received into dataflow queue 222. Thus in an implementation, dataflow queue 222 of VGA data generator 210 may have a depth of one end of frame token 202, and production of address and data tokens 204 may be dependent upon receiving and reading out such an end of frame token 202 from dataflow queue 222 for processing by VGA data generator 210. Alternatively, VGA frame buffer memory 214 may have sufficient storage for more than one image frame. In this alternative embodiment, VGA data generator 210 may pre-generate additional image frames, storing such additional image frames in VGA frame buffer memory 211 via DMA engine 213. However, once VGA frame buffer memory 211 is full, the aggregate rate of frame generation by VGA data generator 210 is forced by VGA controller 214 to match the frame rate of VGA display device 220; and this control of the aggregate rate of frame generation by VGA data generator 210 is done by use of end of frame tokens 202.

In another alternative embodiment, the rate at which image frames are displayed may be lower than the refresh rate. In such an embodiment, VGA data generator 210 may account for this rate difference by consuming some number greater than one of end of frame tokens 202 stored in dataflow queue 222 prior to generation of a subsequent image frame data.

In addition to frame rate timing, there is pixel data timing. It should be appreciated that each dataflow queue, such as dataflow queues 222 through 224 as well as pixel data queue 221, has a finite capacity to store data. More generally, it should be appreciated that a dataflow queue is a queue between a dataflow data producer and dataflow data consumer. As dataflow queues generally have a finite capacity, the capacity of dataflow queues may have direct consequences with respect to the rate at which data may be supplied, and in this example the rate at which data may be supplied to VGA controller 214. As previously indicated, this rate throttling may be accomplished by passing periodic rate-throttling tokens from the VGA controller 214 to VGA display DMA controller 212, and these rate-throttling tokens indicate that VGA controller is ready to receive a set amount of pixel data 208. Again, these rate-throttling tokens, for the size of pixel data queue 221 being less than an entire image frame, may be start of line tokens 201.

The rate at which pixel data 208 is displayed on VGA display device 220 may generally be a constant based on the attributes of VGA display device 220. Consequently, the frequency with which start of line tokens 201 synchronize display output 209 with pixel data 208 supplied to pixel data queue 221 corresponds directly to the size of pixel data queue 221. In other words, the frequency with which start of line tokens 201 are sent corresponds directly to the data unit size that VGA controller 214 requests for buffering image data.

The selection of this data unit size for buffering pixel data, or more generally messages, may take into account the physical implementation of hybrid system 200 and the effect of latency from message issuance to data availability, or more particularly data availability at VGA controller 214. In other words, VGA frame buffer memory 211 may be implemented with memory having an associated latency. The unit of pixel data 208 provided as read data from VGA frame buffer memory 211 as generally indicated by arrow 207 ("pixel data 207") may take into account this latency. Latency may be due to the arbitration of multi-ported memory, memory refresh behavior, implementation of dataflow blocks, or other implementation details affecting latency. So even though in the example described the unit of data is one horizontal line of an image displayed on VGA display device 220, other data unit sizes may be used. The unit of data of one horizontal line of a display may be applicable to a variety of image sizes and implementation resolutions.

The receipt of a start of line token 201 by VGA display DMA controller 212 causes a tuple of address and length tokens 205 to be sent to DMA engine 213. Responsive to address and length tokens 205, DMA engine 213 retrieves pixel data 207 from VGA frame buffer memory 211 and supplies such read pixel data 207 as a token of pixel data 208 ("token 208") to pixel data queue 221 of VGA controller 214.

To supply pixel data 208 to VGA controller 214 in a timely manner to ensure proper display on VGA display device 220, VGA controller 214 issues start of line tokens 201 one start of line period as provided in Equation (2) prior to the start of the first active line of image data to be displayed as an image of VGA display device 220. If $T_{lat}$ is the maximum time from issuance of a start of line token 201 until receipt of a first pixel data token 208 by VGA controller 214, then so long as $T_{lat}$ is less than $T_{sol}$, the initial delay of one horizontal line of an image to be displayed is sufficient. More generally, VGA controller 214 issues a first start of line token 201 $N_{pre}$ lines prior to the first active line of video to be displayed for an image, where $N_{pre}$ is mathematically expressed as follows in Equation (3):

$$N_{pre} = \text{ceiling}\,\frac{T_{lat}}{T_{sol}}. \tag{3}$$

It should be appreciated that $N_{pre}$ ensures that a pixel data token 208 is available to VGA controller 214 when a line of pixel data is to be displayed. Capacity of pixel data queue 221 may be implemented sufficient to store more than the $N_{pre}$ prior lines to handle runtime variations in $T_{lat}$. For example, pixel data queue 221 may be configured to store ($N_{pre}$+1) multiplied by the width of a line of pixels in order to handle such runtime variations in $T_{lat}$.

In an alternative embodiment, pixel data queue 221, responsive to a full condition thereof, may be configured to assert back pressure on DMA engine 213, as generally indicated by full signal 225. In this alternative embodiment, start of line tokens 201 are redundant and thus may be eliminated as the production rate of pixel data tokens may be matched to consumption rate by VGA controller 214 based on capacity of pixel data queue 221.

Effective and timely management of start of line tokens 201 and end of frame tokens 202 is used by hybrid system 200 for overall timing, and accordingly such tokens may effectively be treated as markers in absolute system time. Along those lines, dataflow blocks, namely VGA generator 210 and VGA display DMA controller 212, may treat tokens in the order in which they are stored in queues 222 and 224, respectively, namely the order in which such tokens arrive, for such system timing. Two facets of system timing include stalling dataflow block behavior and avoiding stale timing tokens.

Dataflow blocks which are part of a time-sensitive path for overall system performance and which interact with timed domains may be configured such that their functionality is stalled until receipt of a timed token. Thus, VGA display DMA controller 212 and VGA data generator 210 may be configured such that they are stalled until receipt of associated tokens in order to interface with a timed domain. The stalling behavior may be implemented as part of a controlling state machine for each of VGA data generator 210 and VGA display DMA controller 212 as indicated by state machines 230 and 232, respectively. For VGA display DMA controller 212, state machine 232 causes VGA display DMA controller 212 to enter a stall state until a start of line token 201 is received into dataflow queue 224. Subsequent to receipt of such a start of line token 201 and reading out of such a start of line 201 token from dataflow queue 224, state machine 232 causes VGA display DMA controller 212 to transition to a state in which one horizontal line's worth of address and length tuples, namely address and line tokens 205, are generated followed by returning to a stall state pending receipt of a next start of line token 201.

For VGA data generator 210, a stall state occurs after generation and storing of one complete image frame of pixel data in each allocated image frame buffer or buffers of VGA frame buffer memory 211. In an embodiment, the image frame display is a fraction of the display rate, meaning that a number of end of frame tokens 202 may be received in order to transition from the stall state into a data generation state. For example, if the image frame display rate is one half of the display refresh rate, then transition from the stall state of VGA data generator 210 occurs after receipt of two end of frame tokens 202 into dataflow queue 222.

While in a stall state, other behavior of hybrid system 200 not related to a time-sensitive path may be operative. Thus, consumption of a timed token and entry into a state where data is to be provided along a time-sensitive path, including the generation of data in such state, may take priority with respect to transition control by a state machine in order to ensure timely generation and providing such time-sensitive data.

With respect to avoiding stale timing tokens, dataflow blocks, namely VGA data generator 210 and VGA display DMA controller 212, that react to timed tokens ensure that the current timed token is not stale. Stale tokens may occur at the start of processing when a timed environment begins generating timed tokens prior to the start up of either or both of VGA data generator 210 and VGA display DMA controller 212. Thus the intervening queues begin stacking such tokens. In other words, dataflow queues 222 and 224 begin stacking end of frame tokens 202 and start of line tokens 201, respectively. Thus, it may be that any tokens in either or both of dataflow queues 222 or 224 that are not at the top of the stack, namely the tail tokens, are stale.

Stale tokens may be eliminated via a free-running portion of logic which consumes timed tokens generally as rapidly as possible. Thus, logic of VGA data generator 210 and VGA display DMA controller 212 may be configured to calculate an "at least" flag indicating that a minimum number of tokens has been received since the last execution of data generation for a time-sensitive path, sometimes referred to as critical path or critical path logic. In this example for VGA display DMA controller 212, at least one start of line token 201 is the minimum number of tokens to have been received since the last execution or processing for generation of address and length tokens 205.

For dataflow blocks that run at slower rates than processing of tokens, a number of tokens may be received to reach an at least flag threshold immediately upon receipt. For example, VGA data generator 210 in an alternative embodiment may be configured to receive two end of frame tokens 202 for display at half the refresh rate, as previously described. Thus, logic of VGA data generator 210 associated with a critical path, namely critical path logic, may be configured to execute as soon as a requisite number of timed tokens 202 have been received into a dataflow queue 222, and concurrently any stale tokens may be drained from dataflow queue 222. This concurrency occurs due to free running logic in VGA data generator 210, which is consuming timing tokens and calculating an "at least" threshold, operating in parallel with the critical path logic. Calculating the "at least" threshold may involve having VGA data generator 210 configured to count incoming timed tokens 202 received into dataflow queue 222. This free running logic in VGA data generator 210 is effectively draining any (potentially) stale tokens.

In an alternative embodiment, a timed block, namely VGA controller 214, and one or more dataflow blocks, namely either or both VGA data generator 210 or VGA display DMA controller 212, may be implemented with fall-through queues. As described herein, queues 222 and 224 provide tokens in a sequential order with no data loss for respective processing by actors of dataflow blocks. However, in a hybrid system 200 where timed tokens, namely end of frame tokens 202 and start of line tokens 201, are providing only relative timing and not actual data values, fall-through queues may be used for dataflow queues 222 and 224. A fall-through queue in this context is a queue which provides storage for only a set number of tokens and new token input to a full fall-through queue pushes the head token out. By "head token," it is meant the token at the bottom of the stack or the oldest received token in a stack. Thus, a fall-through queue always contains only the most recently received token or tokens.

By using a fall-through queue between VGA controller 214 and VGA display DMA controller 212, VGA display DMA controller 212 may simply stall on the availability of a token in fall-through queue 224. Moreover, because queue 224 is a fall-through queue for storing start of line tokens 201, any such tokens in fall-through queue 224 by definition are not stale. For dataflow queue 222 being a fall-through queue in the half-refresh rate embodiment previously described, a fall-through dataflow queue 222 may contain sufficient storage for two end of frame tokens 202 as VGA data generator 210 in this embodiment runs at half the refresh rate, and such fall-through dataflow queue 222 would always contain the two most recently input tokens provided thereto.

Figure 3:
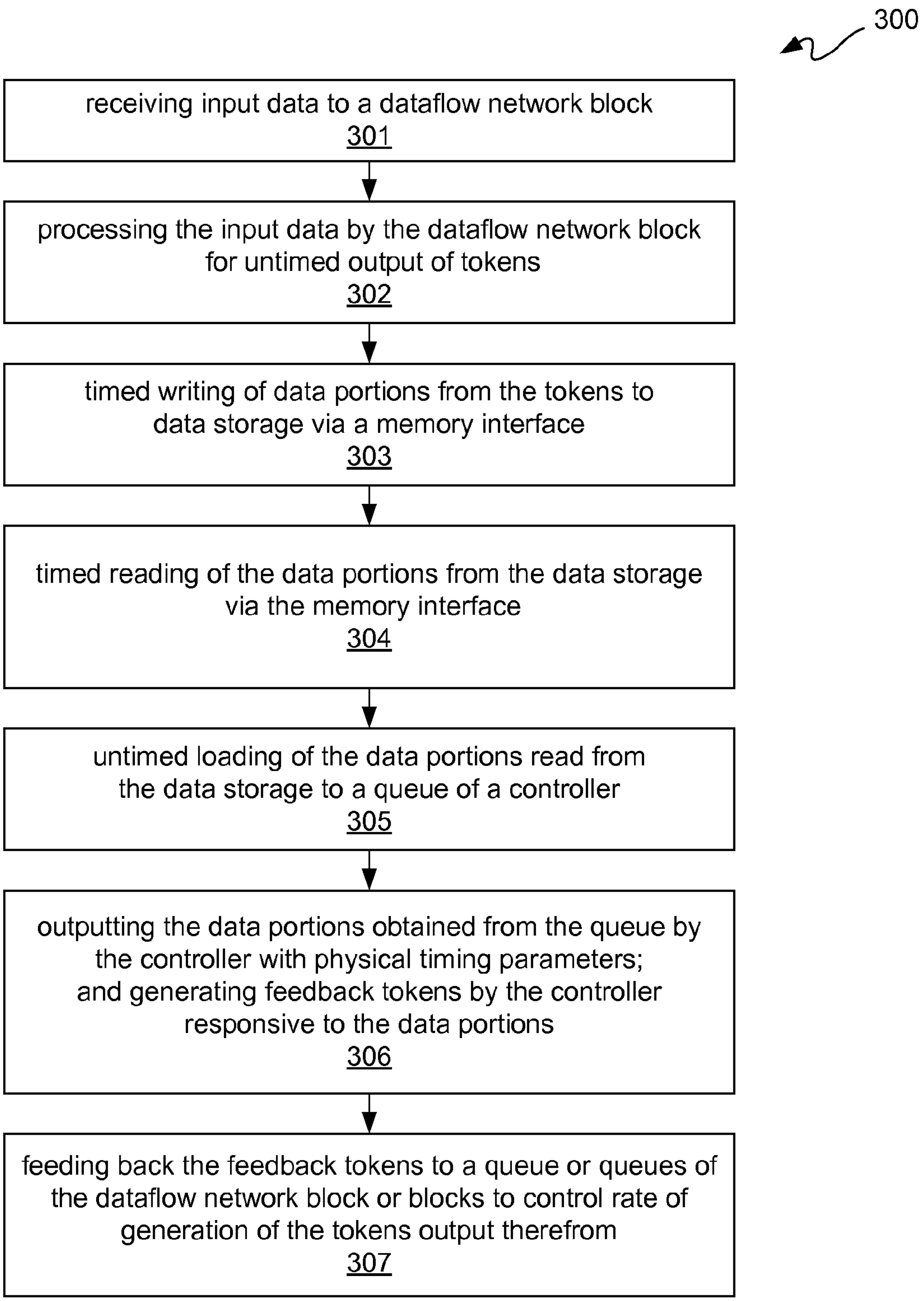
FIG. 3 is a flow diagram depicting a process for interfacing temporal and nontemporal domains ("interfacing process"), in accordance with an embodiment of the present invention.

FIG. 3 is a flow diagram depicting an exemplary embodiment of a process for interfacing temporal and non-temporal domains ("interfacing process") 300. Interfacing process 300 is described with simultaneous reference to FIGS. 2 and 3, as interfacing process 300 recapitulates description provided with reference to FIG. 2.

At 301, input data is received by a dataflow network block, such as input data 203 provided to VGA data generator 210. At 302, the input data received is processed by the dataflow network for untimed output of tokens. For example, tokens 204 may be untimed output of pixel data and address information.

At 303, timed writing of data portions from the tokens to data storage is performed via a memory interface. For example, pixel data in tokens 204 may be written to VGA frame buffer memory 211 via DMA engine 213 at addresses indicated in tokens 204. At 304, timed reading of the data portions from data storage is performed via the memory interface. This reading for example may be a reading of pixel data stored in VGA frame buffer memory 211 via DMA engine 213 responsive to address and length information provided via tokens 205 from VGA display DMA controller 212. Alternatively, other sequential reading from VGA frame buffer memory 211 may be used.

At 305, untimed loading of the data portions read from data storage to a queue of a controller is performed. For example, timed reading of data portions may be read from VGA frame buffer memory 211 via DMA engine 213 responsive to tokens 205 as previously described; however, such pixel data 208 may be loaded into dataflow queue 221 in an untimed manner. Dataflow queue 221 may be a part of VGA controller 214.

At 306, data portions obtained from the queue by the controller are output with physical timing parameters. For example, display output 209 may be provided by VGA controller 214 to VGA display device 220, where the data used for such output is obtained from dataflow queue 221. Also at 306, feedback tokens are generated by the controller responsive to the data portions. For example, pixel data 208 stored in dataflow queue 221 may be used for generating feedback tokens, namely start of line tokens 201 and end of frame tokens 202.

At 307, the feedback tokens are fed back to a queue or queues of the dataflow network block or blocks to control rate of generation of tokens output therefrom. For example, end of frame tokens 202 are provided to dataflow queue 222 of VGA generator 210 to control rate of generation of tokens 204 by VGA data generator 210. Similarly, tokens 201 are fed back to VGA display DMA controller 212 to dataflow queue 224 of VGA display DMA controller 212 to control the rate at which tokens 205 are generated. With respect to the rate at which tokens are generated, it is not meant the rate at which tokens are output from the respective dataflow network blocks, such as from VGA data generator 210 and VGA display DMA controller 212. Rather, controlling the rate of generation of tokens means either allowing tokens to be output or not allowing tokens to be output by a respective dataflow network block. Thus, throttling the rate of token generation means allowing dataflow blocks to operate or not to operate for the purpose of outputting tokens. For example, end of frame tokens 202 may be generate by VGA controller 214 responsive to physical timing parameters in display output 209.

It should be appreciated that dataflow networks, such as VGA data generator 210 and VGA DMA display controller 212, may be implemented in programmable logic including DSPs, of a PLD, such as FPGA 100 of FIG. 1. It should further be understood that such a PLD, such as FPGA 100, may include additional circuitry for implementing processes performed by such dataflow blocks. For example, a PLD, such as FPGA 100, may have programmable logic configured to provide a memory interface, such as DMA engine 213, and a display controller, such as VGA controller 214. Moreover, a PLD, such as FPGA 100 of FIG. 1, may include memory for providing data storage, such as VGA frame buffer memory 211. Additionally, even though the above description has been in terms of hardware, it should be appreciated that rate control using feedback tokens for controlling the rate of upstream token generation by dataflow network blocks for providing to an interface coupled with real world timing constraints, may be implemented in software, hardware, or a combination of hardware and software.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for interfacing temporal and non-temporal domains, comprising:

receiving input data to a first dataflow network block;

processing the input data by the first dataflow network block to output first tokens;

untimed output of the first tokens from the first dataflow network block;

obtaining the first tokens by a memory interface for writing data portions of the first tokens to data storage;

timed writing of the data portions to the data storage;

timed reading of the data portions from the data storage;

untimed sending of the data portions read to a first queue of a first controller block;

outputting the data portions obtained from the first queue by the first controller block, the data portions being output by the first controller block with physical timing parameters;

generating second tokens by the first controller block responsive to the physical timing parameters;

feeding back the second tokens to a second queue of the first dataflow network block to control rate of generation of the first tokens by the first dataflow network block; and wherein the timed writing and the timed reading complete a read or a write within a specific number of clock cycles, and the untimed sending occurs using the first queue.

2. The method according to claim 1, further comprising generating third tokens associated with the first tokens by a second controller block configured to generate the third tokens, the second controller block being a second dataflow network block;

obtaining the third tokens by the memory interface, the third tokens being untimed as output from the second dataflow network block and being used by the memory interface for the reading of the data portions from the data storage;

generating fourth tokens by the first controller block responsive to the data portions; and feeding back the fourth tokens to a third queue of the second dataflow network block to control rate of generation of the third tokens output by the second dataflow network block.

3. The method according to claim 2, wherein:

the input data is encoded image data;

the first dataflow network block is configured to decode the encoded image data to provide pixel data for the first tokens for image frames;

the data portions are the pixel data used to form the image frames;

the first tokens include the pixel data and first address information associated with the pixel data;

the second dataflow network block is configured to generate second address information and data length information respectively associated with the first address information and the pixel data; and the second dataflow network block is further configured to provide the second address information and the data length information as the third tokens.

4. The method according to claim 3, wherein:

the second tokens are end of frame tokens; and the fourth tokens are start of line tokens;

the first controller block is a video graphics array controller;

the second controller block is a display direct memory access controller; and the memory interface is a direct memory access engine.

5. The method according to claim 1, wherein the first dataflow network block is configured to timely unload the second tokens from the second queue sufficient to avoid the second tokens from becoming stale.

6. The method according to claim 1, further comprising:

generating third tokens associated with the first tokens by a second controller block configured to generate the third tokens, the second controller block being a second dataflow network block;

untimed sending of the third tokens from the second dataflow network block to the memory interface, the third tokens being used by the memory interface for the reading of the data portions from the data storage;

generating a control signal responsive to the data portions filling the first queue; and feeding back the control signal to the memory interface to control rate of the reading of the data portions from the data storage.

7. The method according to claim 6, wherein:

the input data is encoded image data;

the first dataflow network block is configured to decode the encoded image data to provide pixel data for the first tokens for image frames;

the data portions are the pixel data used to form the image frames;

the first tokens include the pixel data and first address information associated with the pixel data;

the second dataflow network block is configured to generate second address information and data length information respectively associated with the first address information and the pixel data; and the second dataflow network block is further configured to provide the second address information and the data length information as the third tokens.

8. The method according to claim 7, wherein:

the second tokens are end of frame tokens;

the first controller block is a video graphics array controller;

the second controller block is a display direct memory access controller; and the memory interface is a direct memory access engine.

9. The method according to claim 1, wherein the first dataflow network block is configured to count to determine an at least threshold number of the second tokens have been received prior to generation of the first tokens.

10. A hybrid dataflow timed domain system, comprising:

a first dataflow network block coupled to receive input data, the first dataflow network block being enabled to process the input data to output first tokens wherein the first tokens output from the first dataflow network block are untimed;

a memory interface coupled to receive the first tokens output from the first dataflow network block and enabled to write data portions of the first tokens to data storage, the data storage being coupled to the memory interface for timed writing of the data portions to the data storage and for timed reading of the data portions from the data storage;

a first queue of a first controller block coupled for untimed receipt of the data portions read from the data storage, wherein the first controller is enabled to obtain the data portions from the first queue for output with physical timing parameters by the first controller block, generate second tokens responsive to the physical timing parameters and feed back the second tokens to a second queue of the first dataflow network block; and wherein the first dataflow network block is enabled to control the rate of generation of the first output tokens responsive to the second tokens fed back, and wherein the timed writing and the timed reading complete a read or a write within a specific number of clock cycles, and the untimed receipt occurs using the first queue.

11. The system according to claim 10, further comprising a second controller block configured to generate third tokens associated with the first tokens, the second controller block being a second dataflow network block;

wherein the memory interface is coupled to the second dataflow network block and is enabled to receive the third tokens therefrom, the third tokens being untimed as output from the second dataflow network block and being used by the memory interface for the reading of the data portions from the data storage;

wherein the first controller block is further enabled to generate fourth tokens responsive to the data portions and is coupled to a third queue of the second dataflow network block for feeding back the fourth tokens thereto; and wherein the second dataflow network block is configured to control the rate of generation of the third tokens responsive to the fourth tokens.

12. The system according to claim 11, wherein:

the input data is encoded image data;

the first dataflow network block is enabled to decode the encoded image data to provide pixel data for the first tokens for image frames;

the data portions are the pixel data used to form the image frames;

the first tokens include the pixel data and first address information associated with the pixel data;

the second dataflow network block is enabled to generate second address information and data length information respectively associated with the first address information and the pixel data; and the second dataflow network block is further enabled to provide the second address information and the data length information as the third tokens.

13. The system according to claim 12, wherein:

the second tokens are end of frame tokens; and the fourth tokens are start-of-line tokens.

14. The system according to claim 13, wherein:

the first controller block is a video graphics array controller;

the second controller block is a display direct memory access controller; and the memory interface is a direct memory access engine.

15. The system according to claim 10, further comprising:

a second controller block enabled to generate third tokens associated with the first tokens, the second controller block being a second dataflow network block and being enabled for untimed sending of the third tokens to the memory interface;

wherein the memory interface is coupled to receive the third tokens and enabled to use the third tokens for the reading of the data portions from the data storage;

the first queue is configured to generate a control signal responsive to the data portions filling the first queue; and wherein the first queue is coupled to the memory interface for feeding back the control signal to the memory interface to control rate of reading of the data portions from the data storage so as not to overflow the first queue.

16. The system according to claim 15, wherein:

the input data is encoded image data;

the first dataflow network block is enabled to decode the encoded image data to provide pixel data for the first tokens for image frames;

the data portions are the pixel data used to form the image frames;

the first tokens include the pixel data and first address information associated with the pixel data;

the second dataflow network block is enabled to generate second address information and data length information respectively associated with the first address information and the pixel data; and the second dataflow network block is further enabled to provide the second address information and the data length information as the third tokens.

17. The system according to claim 16, wherein the second tokens are end of frame tokens.

18. The system according to claim 17, wherein:

the first controller block is a video graphics array controller;

the second controller block is a display direct memory access controller; and the memory interface is a direct memory access engine.

19. The system according to claim 11, wherein:

the first controller block is further enabled to generate fourth tokens responsive to the data portions;

the first controller block is coupled to a fourth queue of the second dataflow network block for feeding back the second tokens thereto; and the second dataflow network block is enabled to synchronize generation of the third tokens with generation of the first tokens by the first dataflow network block responsive to the second tokens fed back to the fourth queue.

20. The system according to claim 19, wherein the first controller block, the first dataflow network block, the second dataflow network block, the data storage, and the memory interface are located in a programmable logic device.

* * * * *